United States Patent [19]

Grzywana

[11] Patent Number: 5,185,505
[45] Date of Patent: Feb. 9, 1993

[54] MICROWAVE ICED TEA MAKER

[75] Inventor: Stanley E. Grzywana, Elyria, Ohio

[73] Assignee: Mr. Coffee, inc., Bedford Heights, Ohio

[21] Appl. No.: 706,752

[22] Filed: May 29, 1991

[51] Int. Cl.⁵ .............................................. H05B 6/80
[52] U.S. Cl. ...................... 219/10.55 F; 219/10.55 E; 99/306; 99/DIG.14
[58] Field of Search ................. 219/10.55 E, 10.55 F, 219/10.55 R; 99/283, 295, 306, 316, 323, DIG. 14; 426/77, 115, 234, 243, 241, 433

[56] References Cited

U.S. PATENT DOCUMENTS

| | | | |
|---|---|---|---|
| 2,176,082 | 10/1939 | Kise | 99/306 |
| 2,600,566 | 6/1952 | Moffett, Jr. | 99/221 |
| 2,601,067 | 6/1952 | Spencer | 219/10.55 R |
| 2,714,070 | 7/1955 | Welch | 99/221 |
| 2,926,234 | 2/1960 | Palmer | 392/445 |
| 2,948,618 | 8/1960 | Saint | 99/306 |
| 3,139,344 | 6/1964 | Weisman | 99/306 |
| 3,442,199 | 5/1969 | McGrail | 99/306 |
| 3,587,444 | 6/1971 | Godel et al. | 99/306 |
| 3,589,272 | 6/1971 | Bouladon et al. | 99/295 |
| 3,985,069 | 10/1976 | Cavalluzzi | 99/295 |
| 4,104,957 | 8/1978 | Freedman, et al. | 219/10.55 E |
| 4,233,325 | 11/1980 | Slangan et al. | 219/10.55 E |
| 4,303,196 | 12/1981 | Raines et al. | 99/283 |
| 4,381,696 | 5/1983 | Koral | 219/10.55 E |
| 4,386,109 | 5/1983 | Bowen et al. | 219/10.55 E |
| 4,577,080 | 3/1986 | Grossman | 219/10.55 E |
| 4,642,443 | 2/1987 | Jorgensen | 219/10.55 E |
| 4,721,835 | 1/1988 | Welker | 219/10.55 E |
| 4,900,886 | 2/1990 | Bridges | 219/10.55 E |
| 4,908,222 | 3/1990 | Yu | 219/10.55 E |
| 4,999,470 | 3/1991 | Fuchs, Jr. | 219/10.55 F |

*Primary Examiner*—Geoffrey S. Evans
*Assistant Examiner*—Tuan Vinh To
*Attorney, Agent, or Firm*—D. Peter Hochberg; Mark Kusner; Louis J. Weisz

[57] ABSTRACT

An appliance for preparing freshly brewed iced tea with microwave energy comprising a generally funnel-shaped reservoir of molded plastic construction having an open upper end, closed lower end and an aperture near the closed lower end. The reservoir is dimensioned to hold a predetermined amount of water and tea simultaneously. A valve arrangement controls the flow of liquid from the reservoir through the aperture and to move from a closed position to an open position after water in the reservoir has been heated by microwave energy to a predetermined temperature. A receptacle is dimensioned to hold the hot, brewed tea from the reservoir and a predetermined amount of ice, and includes a barrier to shield ice therein from microwave energy.

3 Claims, 6 Drawing Sheets

MICROWAVE ICED TEA MAKER

FIELD OF THE INVENTION

The present invention relates generally to appliances for brewing coffee, tea or the like, and more particularly to a device for quickly and automatically preparing freshly-brewed, iced tea in a microwave oven.

BACKGROUND OF THE INVENTION

For many years, iced tea has been a popular alternative beverage to coffee or soft drinks. Of those people who drink iced tea, many prefer freshly brewed iced tea to packaged powdered mixes (commonly referred to as "instant tea") in that they consider the flavor of freshly brewed tea superior to packaged powdered mixes while others have preference for teas not generally available in packaged powdered form (e.g. herb tea or exotic teas). For some people, however, the preparation of fresh iced tea (i.e. the brewing and chilling of the tea) represents too much of an inconvenience and bother. Thus, it is desirable to provide a device which will provide freshly brewed iced tea in a quick, convenient manner.

To this end, it has been known to use microwave energy to quickly prepare foods and beverages such as coffee and the like. For example, U.S. Pat. Nos. 3,589,272 to Bouladon; 4,104,957 to Friedman, et al.; 4,381,696 to Koral; 4,386,109 to Bowin, et al.; and 4,642,443 to Jorgensen, et al. each disclose an appliance for brewing coffee or the like in a microwave oven. U.S. Pat. Nos. 4,999,470 to Fuchs and 4,721,835 to Welker disclose microwave devices providing single servings of hot coffee or hot tea. None of the aforementioned patents, however, disclose a device capable of preparing freshly brewed iced tea in a microwave oven.

The present invention overcomes the shortcomings of the above-identified patents and provides a device for automatically preparing freshly brewed iced tea using microwave energy.

SUMMARY OF THE INVENTION

In accordance with the present invention, there is provided an apparatus for preparing freshly-brewed iced tea with microwave energy. The apparatus includes a generally funnel-shaped reservoir of molded plastic construction having an opened upper end, a closed lower end and an aperture near the closed lower end. The reservoir is dimensioned to hold a predetermined amount of water and tea simultaneously. Valve means are provided at the aperture of the reservoir and is operable to control flow of liquid from the reservoir through the aperture. The valve means is movable from a closed position wherein flow through the aperture is obstructed and an opened position wherein the flow through the aperture is allowed, the valve means being movable from the closed position to the open position after water in the reservoir has been heated by microwave energy to a temperature sufficient to brew tea. A receptacle is provided to be positioned below the aperture in the funnel-shaped reservoir. The receptacle is dimensioned to have a capacity to hold the predetermined amount of water in the reservoir together with an amount of ice sufficient to cool heated water from the reservoir. The receptacle includes barrier means operable to shield the ice from microwave energy.

In operation, ice within the receptacle is shielded from microwave energy while water within the molded reservoir is heated by microwave energy to a temperature sufficient to brew tea within the reservoir and to actuate the valve means. Upon opening of the valve means, the brewed tea flows through the aperture in the reservoir onto the ice within the receptacle, which ice chills the freshly brewed tea and thereby provides automatically, freshly brewed iced tea.

A primary object of the present invention is to provide a device for providing freshly brewed, iced tea using microwave energy.

Another object of the present invention is to provide a device as described above which produces freshly brewed, iced tea automatically within a microwave oven.

Another object of the present invention is to provide a device as described above wherein water is remained in contact with the flavor particulate until the water has obtained a predetermined brewing temperature.

A still further object of the present invention is to provide a device as described above which is simple, quick and easy to use.

These and other objects and advantages will become apparent from the following description of the preferred embodiment of the invention taken together with the accompanying drawings.

BRIEF DESCRIPTION OF THE DRAWINGS

The invention may take form in certain parts and arrangement of parts, an embodiment of which will be described in detail in the specification and illustrated in the accompanying drawings wherein.

DETAILED DESCRIPTION OF PREFERRED EMBODIMENT

Figure 1:
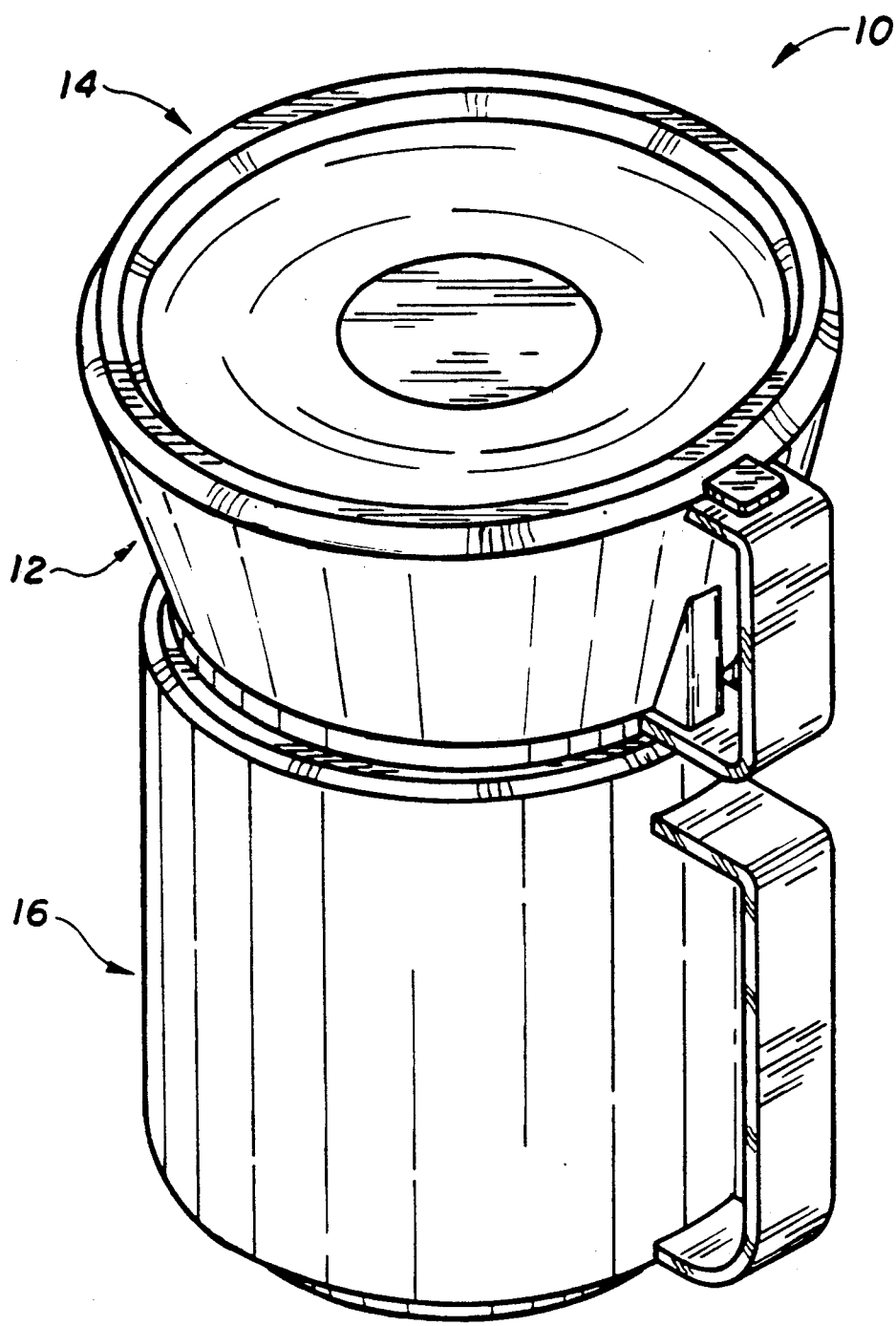
FIG. 1 is a perspective view of a microwave iced tea maker illustrating a preferred embodiment of the present invention.
Figure 2:
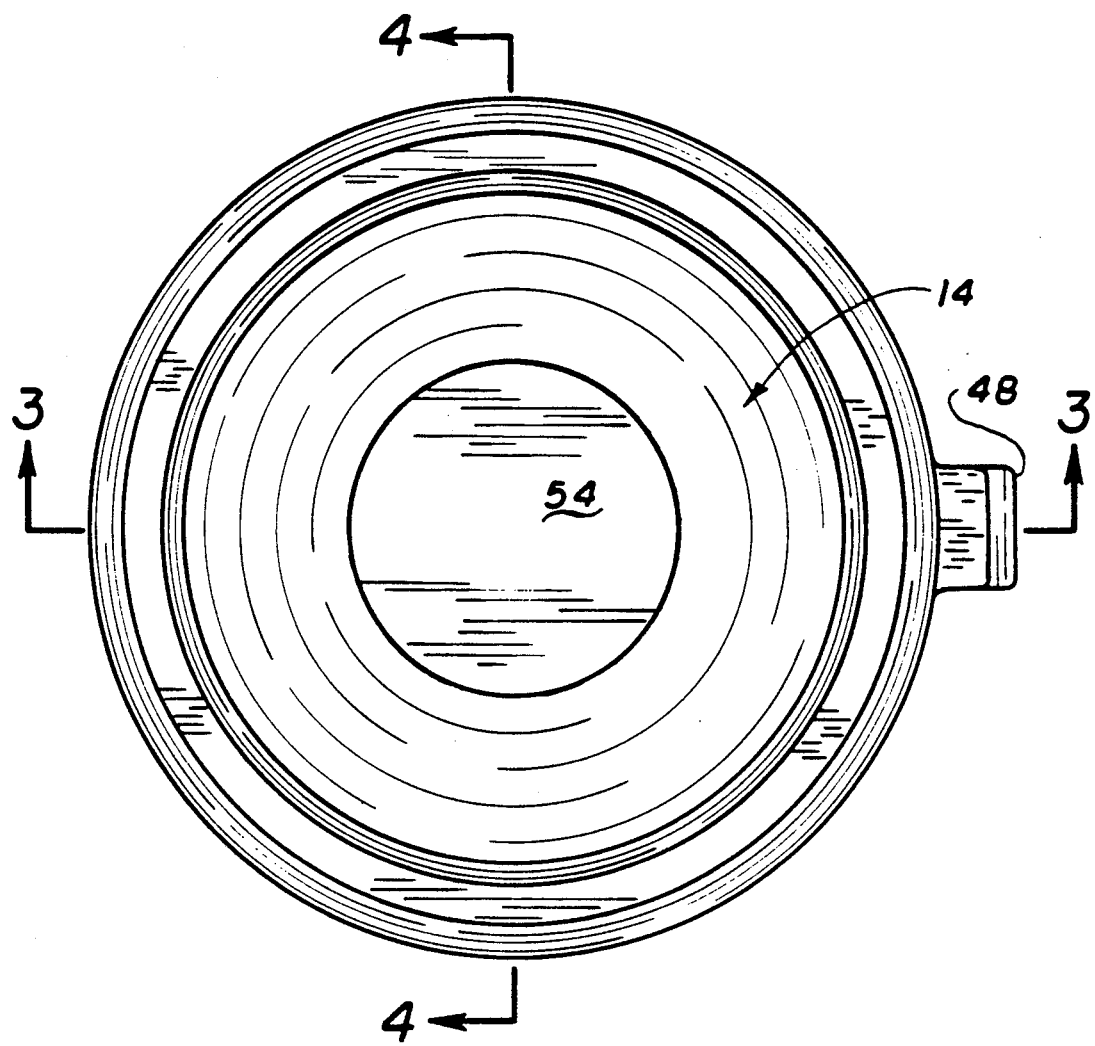
FIG. 2 is a top plan view of the iced tea maker shown in FIG. 1.

Referring now to the drawings wherein the showings are for the purpose of illustrating a preferred embodiment of the present invention, and not for the purpose of limiting same, FIG. 1 shows a microwave iced tea maker 10 illustrating a preferred embodiment of the present invention. Iced tea maker 10 is generally comprised of a reservoir 12, a lid or cover 14 and a receptacle 16.

Reservoir 12 is generally comprised of a conical wall 20 having a generally circular opened upper end and a generally cylindrical wall or skirt 22 which extends downward from conical wall 20. An annular shoulder 24 is defined between conical wall 20 and skirt 22. A generally transverse wall 26 extends across the opening defined by wall 20 and skirt 22. Wall 26 together with conical wall 20 defines a reservoir chamber 30 which is dimensioned to receive a predetermined amount of water and a flavor carrying particulate such as tea or coffee therein. To this end, chamber 30 is preferably dimensioned to receive a conventionally known paper filter of the type typically used in automatic drip coffee makers.

Figure 5:
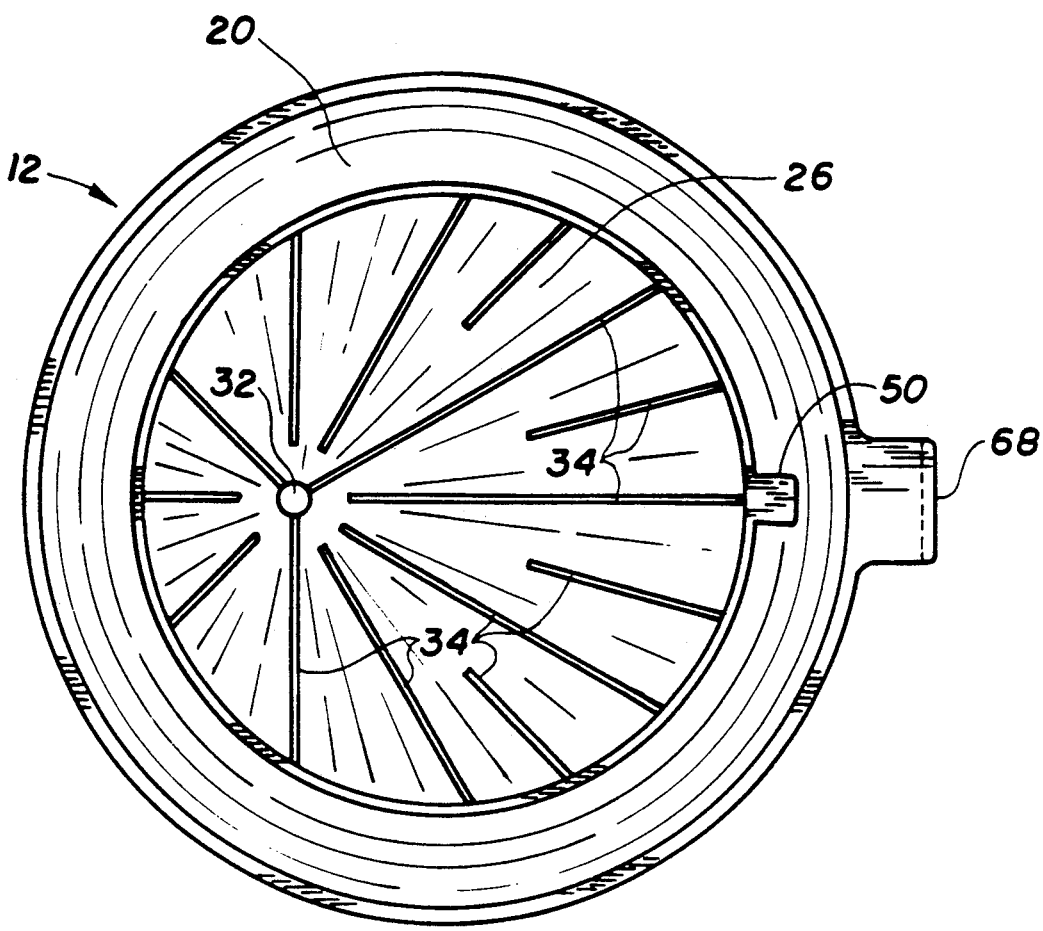
FIG. 5 is a top view of the iced tea maker shown in FIG. 1 with the lid removed illustrating the internal configuration of the reservoir.

An aperture 32 is provided near the lowermost portion of chamber 30 to drain same. A plurality of ribs 34 (best seen in FIG. 5) are provided on the upper surface of transverse wall 26 to facilitate draining of chamber 30 by elevating the filter and particulate matter to be contained in chamber 30 above aperture 32.

A valve arrangement 40 is provided to control the flow of liquid from chamber 30 through aperture 32. Valve arrangement 40 is generally comprised of a plug 42 mounted to a bimetallic strip 44 which is secured to the lower surface of transverse wall 26. In the embodiment shown, bimetallic strip 44 includes apertures which are dimensioned such that strip 44 may be pressed-fit onto posts 46 formed on the lower surface of transverse wall 26. In the embodiment shown, bimetallic strip 44 has an actuation temperature of approximately 160° Fahrenheit, at which temperature strip 44 curves outwardly to a position as shown in phantom in FIG. 3 wherein plug 42 is withdrawn from aperture 32. In other words, valve assembly 40 is movable between a first position (best seen in FIG. 3) wherein plug 42 seals and prevents fluid flow through aperture 32 and a second position (shown in phantom in FIG. 3) wherein plug 42 is removed from aperture 32 and allows fluid to flow from chamber 30.

Figure 3:
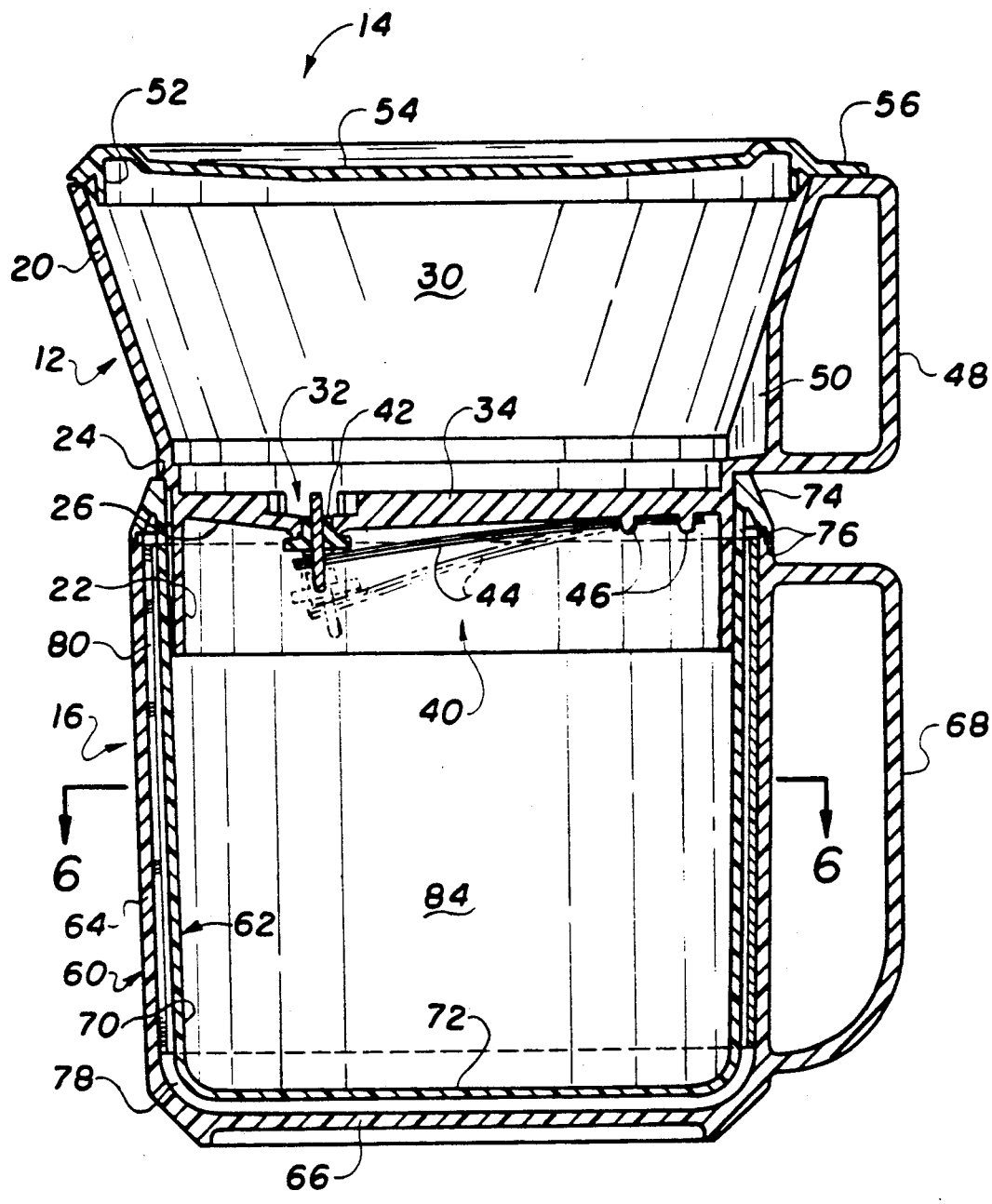
FIG. 3 is a sectional view taken along line 3—3 of FIG. 2.

As best seen in FIGS. 1 and 3, reservoir 12 includes a handle 48 integrally formed therewith. Where the lowermost portion of handle 48 engages conical wall 20, a cavity or recess 50 (best seen in FIG. 3) is formed in conical wall 20 and communicates with chamber 30. Cavity 50 is provided to create a localized "hot spot" with chamber 30. In this respect, it has been found that surface imperfections formed in a generally smooth surface will affect the incidence of microwaves thereagainst, and create a "hot spot" at such location. It is believed that convection currents can be created in the water in reservoir 12 by adding one or more "hot spots" therein and thereby producing an agitating affect within the reservoir.

Lid 14 is generally circular in shape and includes a downward extending annular wall 52 dimensioned to correspond and snugly engage the upper end of conical wall 20. Lid 14 also includes a centrally located concave portion 54 having a plurality of apertures (not shown) formed therein. An outwardly extending tab 56 is provided on the edge of lid 14.

Figure 4:
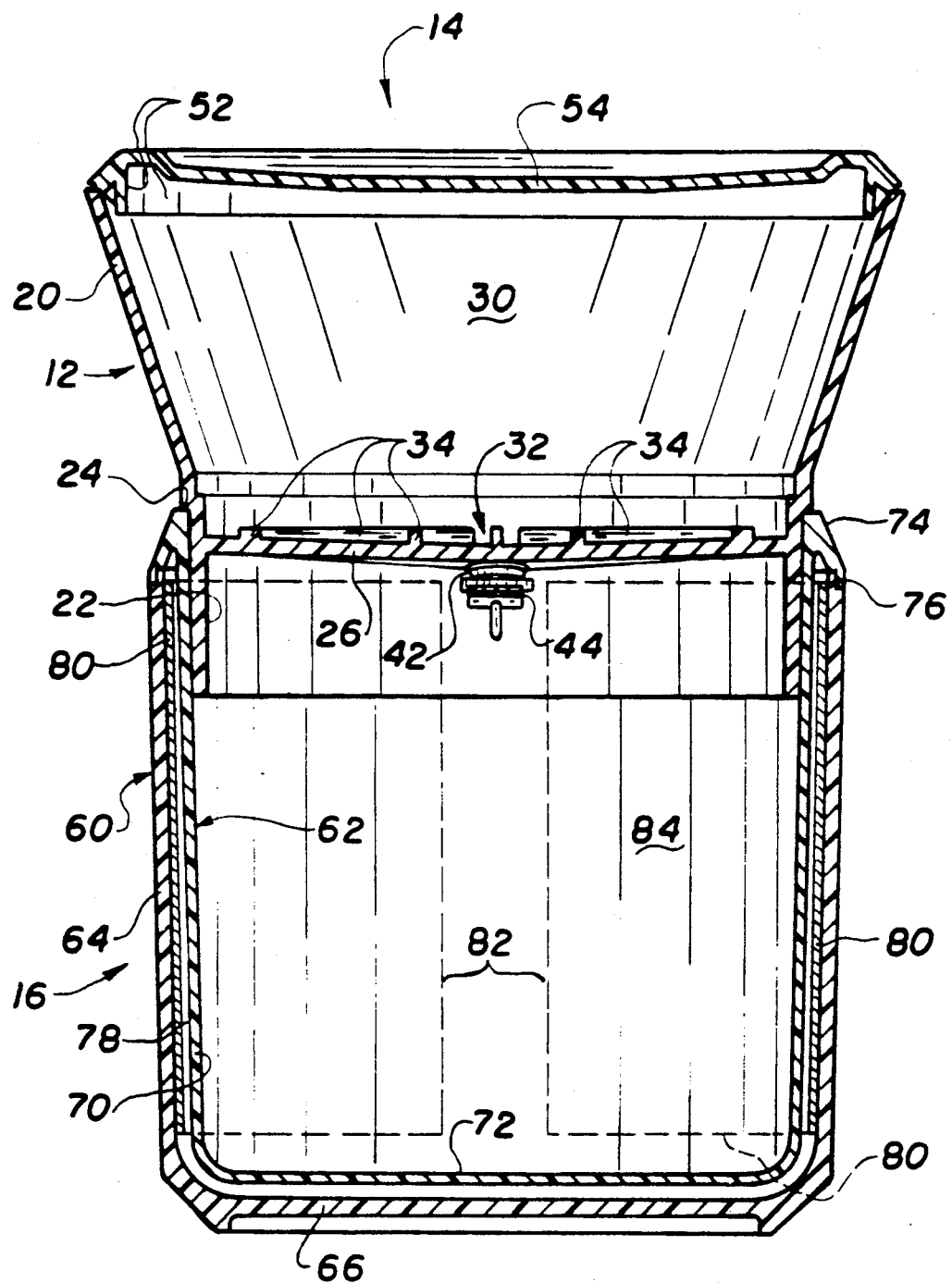
FIG. 4 is a sectional view taken along line 4—4 of FIG. 2.
Figure 6:
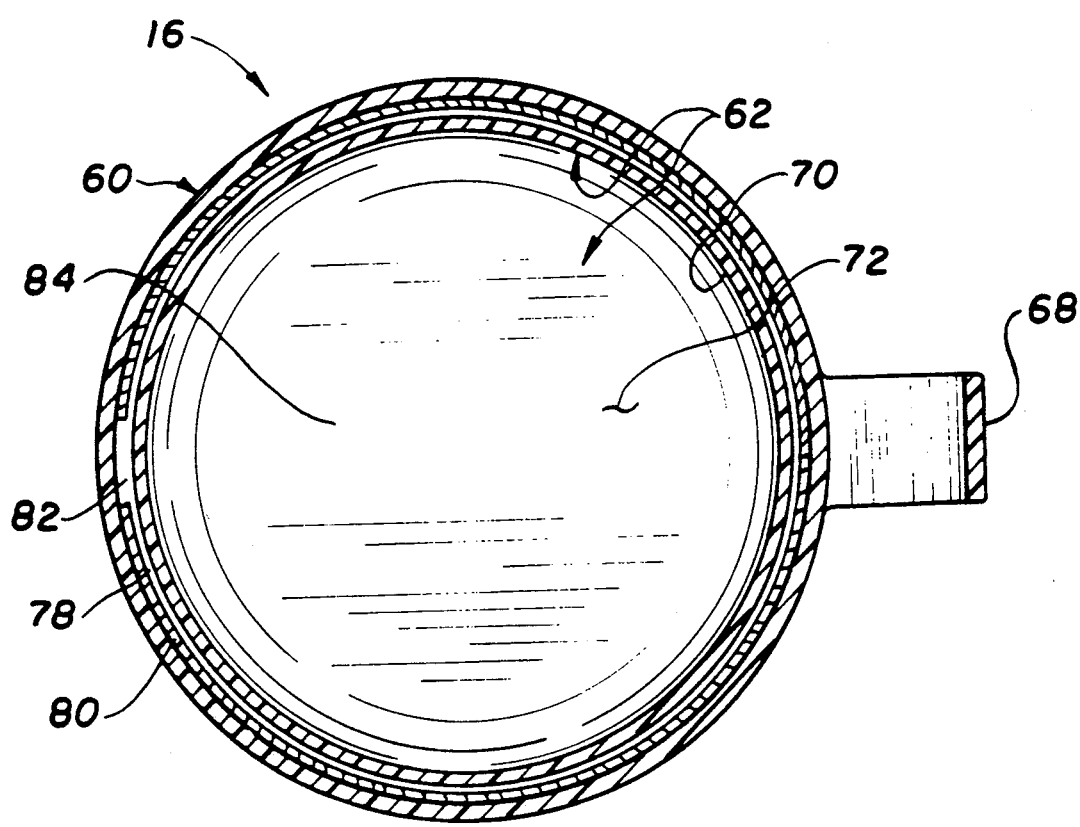
FIG. 6 is a sectional view taken along lines 6—6 of FIG. 3.

Referring now to FIGS. 3 and 4, receptacle 16 is best shown. Receptacle 16 is basically cylindrical in shape and is comprised of an outer shell 60 which is spaced apart from an inner lining 62. Outer shell 60 includes a cylindrical wall portion 64 and a base portion 66. In the embodiment shown, a handle 68 is integrally formed as part of outer shell 60. Handle 68 is preferably dimensioned to generally correspond in size, shape and configuration to handle 48 on reservoir 12. Inner lining 62 is integrally formed and includes a cylindrical wall portion 70 and a bottom portion 72. The upper end of cylindrical wall portion 70 includes a generally outwardly extending flange 74. The free end of flange 74 is dimensioned to abut and interlock with the upper end of cylindrical wall portion 64 of outer shell 60. To this end, in the embodiment shown, the free ends of flange 74 and the upper end of cylindrical wall portion 64 include annular fingers 76 which interlock, as best seen in FIGS. 3 and 4. As mentioned above, inner liner 62 and flange 74 are dimensioned such that a generally uniform gap or spacing 78 is defined between inner lining 62 and outer shell 60. In one respect, gap 78 is provided as an insulating barrier to reduce or prevent heat transfer through receptacle 16. In this respect, the air within gap 78 acts as an insulator in a manner as is conventionally known. In another respect, in the embodiment shown, cap 78 is operable to receive a microwave barrier or shield 80 which according to the present invention, is provided to generally shield the content of receptacle 16 from microwave energy when receptacle 16 is used in a microwave oven. While numerous materials would find advantageous application as a barrier or shielding component, in the embodiment shown, barrier 80 is comprised of a sheet of aluminum. Importantly, according to the present invention, barrier 80 is formed from a sheet of tempered aluminum having sufficient thickness to be positionally stable. In the embodiment shown, a sheet of tempered aluminum having a thickness of approximately 0.5 millimeters is used. The sheet is dimensioned such that a spacing 82 exists between the ends thereof, as best illustrated in FIGS. 4 and 6. Importantly in this respect, when utilizing metal in a microwave oven, it is necessary to avoid situations where a portion of metal is near another metal surface which can produce arcing and sparks. Even rough edges along the side or ends of a metal strip which may be caused by poor cutting or forming procedures can cause arcing. Consequently, it is important that any cut edge of metal is smooth and clean, and that barrier 80 cannot and does not sag or wrinkle within gap 78. To this end, utilization of tempered aluminum sheet of the thickness set forth above (i.e. approximately 0.5 millimeters) provides an inherent resilient property wherein barrier 80 has a preference to assume a flat (i.e. planar) orientation. When inserted into gap 78 of receptacle 16, barrier 80 has a tendency to "spring" outwardly against the inner surface of cylindrical wall portion 64 of outer shell 60. In other words, the tempered aluminum sheet forming barrier 80 (when placed within gap 78 of receptacle 16) assumes a cylindrical configuration as shown in FIG. 6, but its inherent resiliency causes forces it against the interior surface of cylindrical wall portion 64. The frictional engagement between barrier 80 and the inner surface of cylindrical wall portion 64 is sufficient to maintain the position of barrier 80 within gap 78 and thereby maintains spacing 82 between the ends thereof. Moreover, the thickness of barrier 80 is sufficient to ensure that barrier 80 is positionally stable and does not sag or curl up within gap 78 of receptacle 16. Once barrier 80 has been inserted into gap 78 of receptacle 16, inner lining 62 and outer shell 60 are preferably ultrasonically welded together along fingers 68 to secure barrier 80 in place and to seal gap 78.

According to the present invention, the inner lining 62 of receptacle 16 defines a receptacle cavity 84. Cavity 84 is dimensioned to have a capacity equal to that of chamber 30 of reservoir 16 together with additional capacity for holding a predetermined amount of ice. In the embodiment shown, reservoir 12 is dimensioned to hold approximately 10 ounces of water whereas receptacle 16 is dimensioned to have a capacity of approximately 20 ounces. In this respect, receptacle 16 has the capacity to hold approximately 10 ounces of ice in addition to the 10 ounces of water held in reservoir 12.

Further with respect to receptacle 16, the inner diameter of inner lining 62 is dimensioned to closely match the outer diameter of cylindrical skirt 22 of reservoir 12, as best seen in FIGS. 3 and 4. This arrangement ensures insertion and removal of reservoir 12 from receptacle 16 in a generally vertical direction, and avoids tipping or shifting of reservoir 12 relative to receptacle 16.

Referring now to the operation of iced tea maker 10, iced tea may be made utilizing loose tea or tea bags. If loose tea is used, a conventionally known paper filter (not shown) is inserted within chamber 30 of reservoir 12. As indicated above, reservoir 12 and chamber 30 are preferably dimensioned to receive a standard sized paper filter. A predetermined amount of loose tea is then placed within chamber 30. If tea bags are used, one or more tea bags may be placed loosely within chamber 30. A predetermined amount of water is then added to chamber 30. In this respect, chamber 30 is preferably dimensioned to contain sufficient water to produce a single serving of iced tea. As indicated above, in the embodiment shown, reservoir 12 is dimensioned to hold approximately 10 ounces of water. To facilitate proper filling of reservoir 12, receptacle 16 may include an internal or external measuring line indicating the appropriate amount of water to be used within reservoir 12. As will be appreciated, plug 42 of valve arrangement 40 is in a normally closed position which prevents water placed within reservoir 12 from flowing through aperture 32. At this time, lid 14 is secured to reservoir 12.

A predetermined amount of ice is then placed within receptacle 16. To this end, another measuring line may be provided within or outside receptacle 16 to indicate the appropriate amount of ice to be used therein. Reservoir 12 containing the water and tea particulate is then placed over receptacle 16. Cylindrical skirt wall 22, having an outer diameter closely approximating the inner diameter of inner lining 62 requires that reservoir 12 be set upon receptacle 16 from directly above. Annular shoulder 24 rests upon the upper edge of receptacle 16.

Receptacle 16 with reservoir 12 and lid 14 thereon are then placed in a microwave oven. The microwave oven is programmed to heat the water and tea for a predetermined period of time which is determined by the type and intensity of the microwave oven used. As will be understood, the water within reservoir 12 is heated by the microwave energy. As the water temperature within reservoir 12 increases, extraction of tea from the tea particulate results. Cavity 50 formed in conical wall 20 of reservoir 12 produces a localized "hot spot" within chamber 30 of reservoir 12. It is believed that this "hot spot" produces current convection within the chamber to agitate the water and tea particulate during the brewing of the tea. During the heating cycle, any moisture or steam generated within chamber 30 would normally collect on the inner surface of lid 14. Concave portion 54 of lid 14 provides a means for forming droplets to return the liquid and moisture to chamber 30. Excessive steam and pressure may be vented through apertures (not shown) in lid 14.

Importantly, during the heating of the water within reservoir 12, barrier 80 within receptacle 16 shields the ice therein from the microwave energy. In this respect, to the extent possible, barrier 80 prevents the ice within receptacle 16 from being melted and heated by the microwave energy.

As the temperature of the water within chamber 30 increases, heat is conveyed through transverse wall 26 of reservoir 12 to bimetallic strip 44. As indicated above, bimetallic strip 44 has an actuation temperature of approximately 160° Fahrenheit. When strip 44 reaches 160° Fahrenheit, it moves to its opened position, as illustrated in phantom in FIG. 3. As will be appreciated, temperature transfer from chamber 30 to bimetallic strip 44 is not instantaneous and the period of time it takes to heat strip 44 provides sufficient time for extraction of tea from the tea particulate. Upon actuation of bimetallic strip 40, plug 42 is removed from aperture 32 wherein the freshly brewed tea within chamber 30 is allowed to flow therefrom into receptacle 16. As will be appreciated, the hot tea flowing from reservoir 12 through aperture 32 is then cooled by the ice contained within receptacle 16 to provide iced tea.

With the embodiment shown, i.e. an iced tea maker having a reservoir containing approximately 10 ounces of water and a receptacle capable of holding 10 ounces of tea together with approximately 10 ounces of ice, produces approximately 20 ounces of iced tea comprised of tea and ice. The resultant iced tea has a temperature of below 60° Fahrenheit, i.e. approximately 42° Fahrenheit. In this respect, the freshly brewed tea exiting reservoir 12 through aperture 32 has a temperature at that time of greater than 180° Fahrenheit, i.e. approximately 195° to 200° Fahrenheit. The present invention thus provides a device for automatically preparing freshly brewed iced tea utilizing microwave energy which device is quick, simple and easy to use.

The present invention has been described with respect to a preferred embodiment of the present invention. Modifications and alterations will occur to others upon the reading and understanding of the specification. It is intended that all such modifications and alterations be included insofar as they come within the scope of the patent as claimed, or the equivalents thereof.

Having described the invention, the following is claimed:

1. An appliance for preparing freshly brewed iced tea with microwave energy comprising:
 a generally funnel-shaped reservoir of molded plastic construction having an open upper end, a closed lower end and an aperture near said closed lower end, said reservoir dimensioned to hold a predetermined amount of water and tea simultaneously therein;
 valve means operable to control flow of liquid from said reservir through said aperture, said valve means having a normally closed position wherein flow through said aperture is obstructed and being operable to move from said closed position to an open position wherein flow through said aperture is allowed, after said water in said reservoir has been heated by microwave energy to a temperature sufficient to brew said tea;
 a receptacle dimensioned to hold said predetermined amount of water in said reservoir after it has been heated, said receptacle being generally cylindrical in shape and comprised of
 an outer shell,
 an inner lining spaced from said outer shell to form an open space therebetween, and
 a flat microwave shielding sheet having planar resiliency disposed within said space, said sheet maintaining its position within said space as a result of the friction generated between said sheet and said outer shell by the sheet's resiliency.

2. An appliance as defined in claim 1 wherein said microwave shielding sheet is metal.

3. An appliance as defined in claim 2 wherein said metal sheet is tempered aluminum.

* * * * *